US005800728A

United States Patent [19]

Iwata

[11] Patent Number: 5,800,728

[45] Date of Patent: Sep. 1, 1998

[54] PERMANENT MAGNETIC MATERIAL MADE OF IRON-RARE EARTH METAL ALLOY

[75] Inventor: Masao Iwata, Saitama, Japan

[73] Assignee: Hitachi Metals, Ltd., Tokyo, Japan

[21] Appl. No.: 468,333

[22] Filed: Jun. 6, 1995

Related U.S. Application Data

[63] Continuation of Ser. No. 125,611, Sep. 7, 1993, abandoned, which is a continuation of Ser. No. 772,303, Oct. 7, 1991, abandoned.

[30] Foreign Application Priority Data

| | | | |
|---|---|---|---|
| Oct. 5, 1990 | [JP] | Japan | 2-267736 |
| Oct. 11, 1990 | [JP] | Japan | 2-272742 |
| Nov. 13, 1990 | [JP] | Japan | 2-306589 |
| Nov. 13, 1990 | [JP] | Japan | 2-306590 |
| Nov. 13, 1990 | [JP] | Japan | 2-306591 |
| Nov. 13, 1990 | [JP] | Japan | 2-306592 |
| Sep. 13, 1991 | [JP] | Japan | 3-234913 |

[51] Int. Cl.$^6$ .......... C04B 35/64; H01F 1/057

[52] U.S. Cl. .......... 252/62.53; 148/301; 420/83; 420/416; 420/128

[58] Field of Search .......... 148/301, 302; 420/83, 121, 416, 128; 252/62.53, 62.54

[56] References Cited

U.S. PATENT DOCUMENTS

| | | | |
|---|---|---|---|
| 4,770,723 | 9/1988 | Sagawa et al. | 148/302 |
| 4,802,931 | 2/1989 | Croat | 148/302 |

(List continued on next page.)

FOREIGN PATENT DOCUMENTS

| | | |
|---|---|---|
| 60-131949 | 7/1985 | Japan . |
| 60-144909 | 7/1985 | Japan . |
| 64-69001 | 3/1989 | Japan . |

OTHER PUBLICATIONS

Yang et al., "Magnetic and Crystallographic Properties of Novel Fe–Rich Rare–Earth Nitrides of the Type $RTiFe_{11}N_{1\delta}$ (Invited)," *J. Appl. Phys.*, vol. 70, No. 10, pp. 6001–6005, Nov. 15, 1991.

(List continued on next page.)

*Primary Examiner*—John Sheehan
*Attorney, Agent, or Firm*—Sughrue, Mion, Zinn, Macpeak & Seas, PLLC

[57] ABSTRACT

An iron-rare earth metal permanent magnetic composition, comprising predominant phase having a body-centered tetragonal structure, and consisting essentially of an iron-based alloy having a composition represented by the formula:

$$Fe_aR_bM_cN_dB_eC_fCo_gNi_h$$

wherein R represents at least one element selected from the group consisting of Y, Th and the lanthanide elements;

M represents at least one element selected from the group consisting of Ti, Cr, V, Zr, Nb, Al, Mo, Mn, Hf, Ta, W, Mg, Si, Sn, Ge and Ga;

the elements are present in atomic percentages indicated by a, b, c, d, e, f, g and h, wherein a+b+c+d+e+f+g+h=100 atomic %; and further, $3 \leqq b \leqq 30$ $0 \leqq c \leqq 30$ $0 \leqq d \leqq 50$ $0 \leqq e \leqq 50$ $0 \leqq f \leqq 50$ provided that $0.3 \leqq d+e+f \leqq 50$ $0 \leqq g \leqq 50$ and $0 \leqq h < 30$.

2 Claims, 1 Drawing Sheet

U.S. PATENT DOCUMENTS

| | | | |
|---|---|---|---|
| 4,840,684 | 6/1989 | Fujimura et al. | 148/302 |
| 4,849,035 | 7/1989 | Stadelmaier et al. | 148/101 |
| 5,085,716 | 2/1992 | Fuerst et al. | 148/301 |

OTHER PUBLICATIONS

Sagawa et al., "Magnetic Properties of Rare–Earth–Iron–Boron Permanent Magnet Materials," *J. Appl. Phys.*, vol. 57, No. 1, pp. 4094–4096, Apr. 15, 1985.

Fidler et al., Electron Microscopy of Nd–Fe–B Based Magnets, *Journal of Magnetism and Magnetic Materials*, vol. 80, pp. 48–56, 1989.

Coey et al., "Improved Magnetic Properties by Treatment of Iron–Based Rare Earth Intermetallic Compounds in Ammonia," *Journal of Magnetism and Magnetic Materials*, vol. 87, pp. L251–L254, 1990.

Otani et al, "Metal Bonded $Sm_2Fe_{17}N_{3-\delta}$ Magnets", J of Appl Phys. 69(9) May 1, 1991, pp. 6735–6737.

Schnitzke et al, "High Coercivity in $Sm_2Fe_{17}N_x$ Magnets" Appl. Phys. Lett 57(26), Dec. 24, 1990, pp. 2853–2855.

PERMANENT MAGNETIC MATERIAL MADE OF IRON-RARE EARTH METAL ALLOY

This is a Continuation of application Ser. No. 08/125,611 filed on Sep. 7, 1993 (abandoned), which is a continuation of application Ser. No. 07/772,303 filed on Oct. 7, 1991 (abandoned).

FIELD OF THE INVENTION

The present invention relates to a permanent magnet material made of iron-rare earth metal alloy having superior magnetic characteristics.

BACKGROUND OF THE INVENTION

It is known that an intermetallic compound including a transitional metal element of Group VIIIB of the Periodic Table such as Fe, Co, etc., and one element or a combination of at least two elements selected from Y, Th or a lanthanide element, has high crystalline magnetic anisotropy and large saturation magnetization, and that such an intermetallic compound can be utilized as a permanent magnetic material having a high coercive force and high energy product. However, it is often difficult for an alloy consisting only of iron and R to provide a high Curie point and monoaxially crystalline magnetic anisotropy. A material remedied the above problem by adding N as the third element was disclosed in Japanese Patent Publication (OPI) No. 60-131944 by the inventor of the present invention.

Also, an alloy consisting only of samarium and iron is not suitable as a permanent magnet material in view of its Curie point and crystalline magnetic anisotropy. However, recently it has been found that Ti, V, Cr, Al, Si, Mo or W, can be added as the third element of the alloy to improve its own characteristics (K. H. J. Buschow, *Journal of Applied Physics* (1988), vol. 63, p. 3130).

That is, if G represents Ti, V, Cr, Al, Si, Mo or W, a $ThMn_{12}$ body-centered tetragonal structure is stable in an alloy composed of $Sm(Fe_{1-x}G_x)_{12}$, which shows superior characteristics in a permanent magnet. Particularly, $SmFe_{11}Ti$ has remarkable characteristics.

Presently, in the alloy such as $Sm(Fe_{1-x}G_x)_{12}$, it is necessary to use such specific methods as super rapid quenching, mechanical alloying, etc., in order to form the $ThMn_{12}$ body-centered tetragonal structure having preferable characteristics. However, according to the above-mentioned methods, such desired characteristics cannot always be obtained. That is, even when several alloys having the same composition are treated by the same method, it is not always possible to obtain the same preferable characteristics.

SUMMARY OF THE INVENTION

An object of the present invention is to provide a permanent magnet iron-rare earth metal alloy having superior magnetic characteristics.

A further object of the invention is to provide a magnet alloy capable of easily forming a "metastable non-equilibrium" state.

A further object of the invention is to provide a permanent magnet alloy capable of easily and stably forming a $ThMn_{12}$ body-centered tetragonal crystal lattice structure.

It has now been found that these and other objects of the invention are attained by an iron-rare earth metal permanent magnetic composition, comprising predominant phase having a $ThMn_{12}$ body-centered tetragonal structure, and consisting essentially of an iron-based alloy having a composition represented by the formula:

$$Fe_aR_bM_cN_dB_eC_fCo_gNi_h$$

wherein R represents at least one element selected from the group consisting of Y, Th and the lanthanide elements;

M represents at least one element selected from the group consisting of Ti, Cr, V, Zr, Nb, Al, Mo, Mn, Hf, Ta, W, Mg, Si, Sn, Ge and Ga;

the elements are present in atomic percentages indicated by a, b, c, d, e, f, g and h, wherein a+b+c+d+e+f+g+h=100 atomic %; and further, $3 \leqq b \leqq 30$ $0 \leqq c \leqq 30$ $0 \leqq d \leqq 50$ $0 \leqq e \leqq 50$ $0 \leqq f \leqq 50$ provided that $0.3 \leqq d+e+f \leqq 50$ $0 \leqq g \leqq 50$ and $0 \leqq h \leqq 30$.

DETAILED DESCRIPTION OF THE INVENTION

Figure 1:
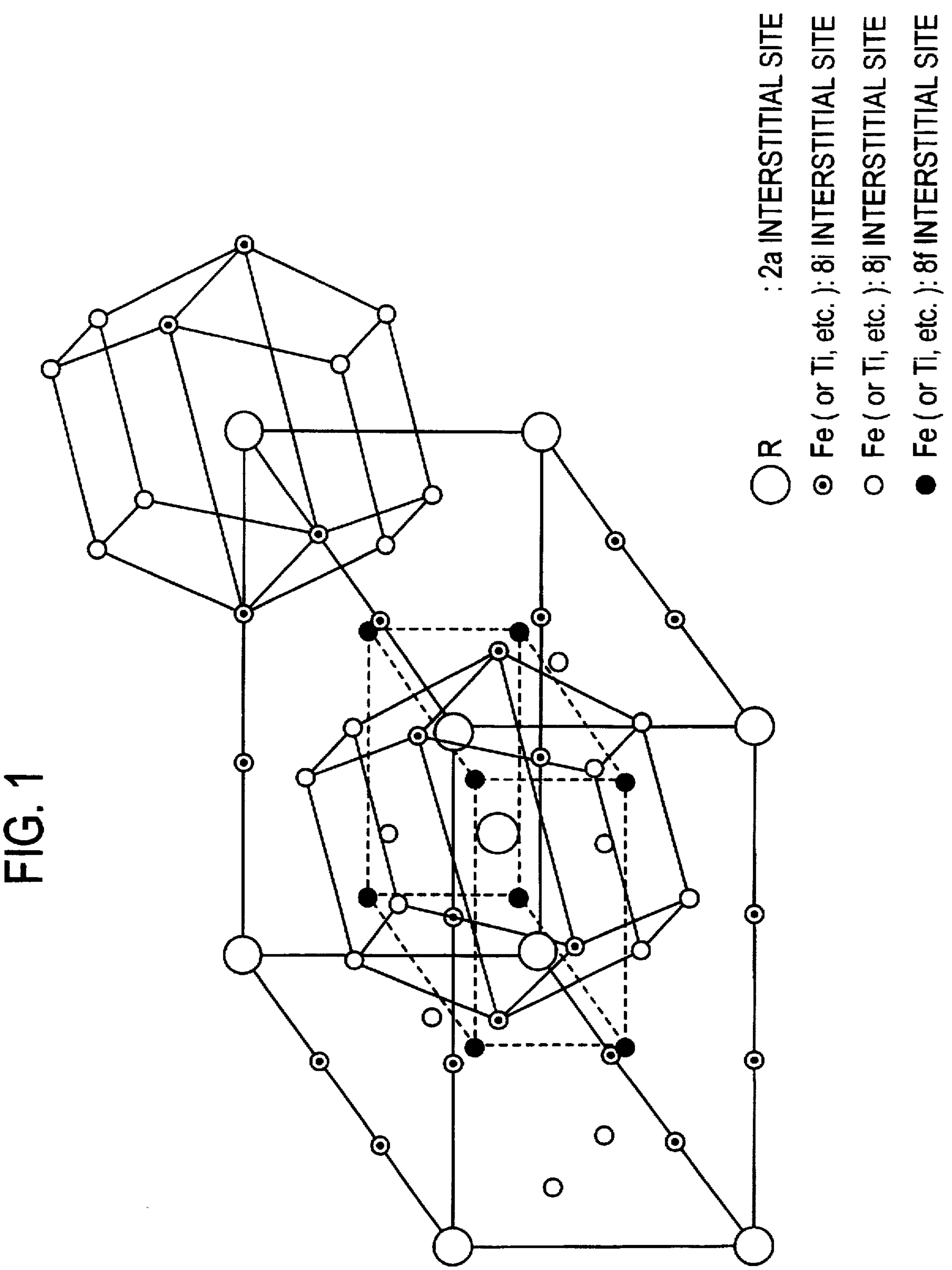
FIG. 1 shows the crystal structure of $ThMn_{12}$ type having a body-centered tetragonal structure.

An iron-rare earth metal permanent magnetic material according to the present invention will now be described in detail.

In the present invention, nitrogen atoms or carbon atoms or boron atoms or a combination at least two elements selected from the group of nitrogen, carbon, and boron, which are interstitial atoms, are included in the alloy to create local distortion of lattices so that the metastable non-equilibrium state, which is different from the original thermally completely stable state, easily occurs.

In the present invention, R is an essential atomic element for producing magnetic anisotropy in order to generate a coercive force. R represents at least one rare earth element or a combination of at least two elements selected from Y, Th and all other lanthanide elements, including La, Ce, Pr, Nd, Pm, Sm, Eu, Gd, Tb, Dy, Ho, Er, Tm, Yb and Lu. It is necessary that the atomic ratio of R is in the range of from 3 to 30%, preferably from 5 to 18%, more preferably from 6 to 12%.

If the atomic ratio of R is less than 3%, it is not possible to obtain sufficient coercive force, thus the lower limit of the atomic ratio of R should be 3%. On the other hand, if the atomic ratio of R is more than 30%, saturation magnetization is reduced, and the material is greatly oxidized so as to cause extremely poor anti-corrosion, thus the upper limit of the atomic ratio of R should be 30%. In order to obtain stable magnetic characteristics, the atomic ratio of R is preferably in the range of from 5 to 18%. In particular, when the ratio of R is in the range of from 6 to 12%, a $ThMn_{12}$ body-centered tetragonal structure can be obtained stably. In order to obtain particularly high flux density and large energy product, the atomic ratio of R should be in the range of from 7 to 9%.

M represents at least one element selected from Ti, Cr, V, Zr, Nb, Al, Mo, Mn, Hf, Ta, W, Mg, Si, Sn, Ge and Ga, and M is preferably included in the alloy in an amount from 0.5 to 30 atom %, preferably from 1 to 15 atom %.

M is an element which contributes to forming a $ThMn_{12}$ body-centered tetragonal structure.

Since many elements in the group defined by M have a strong affinity with the interstitial element nitrogen, carbon and boron, such that the elements are quite effective for stabilizing the alloy. As described hereinafter, M is effective in stabilizing a $ThMn_{12}$ body-centered tetragonal structure. Therefore, M and the interstitial element, (i.e., carbon, boron and nitrogen) together have a great effect in stabilizing the $ThMn_{12}$ body-centered tetragonal structure.

In order to obtain these effects, the atomic ratio of M is preferably in the range of from 0.5 to 30%, more preferably from 1 to 15%. If the ratio is less than 0.5%, such effects cannot be obtained, thus the lower limit of the atomic ratio of M should be 0.5%. On the other hand, if the ratio is more than 30%, saturation magnetization is reduced, and the upper limit of the atomic ratio of M should be 30%. Further, in order to obtain stable magnetic characteristics, the atomic ratio of M is preferably within the range of from 1 to 15%.

Particularly when Ti is selected as M, and the Ti content is more than 10 wt %, a more stable $ThMn_{12}$ type body-centered structure tetragonal is formed, and the thermal-stability is increased.

In the M described hereinabove, every element increases coercive force, but Al, Si, Sn and Ge are less preferred since these elements tend to reduce saturation magnetization.

In the present invention, the interstitial element that is, nitrogen and/or carbon and/or boron, is an active element for forming the $ThMn_{12}$ body-centered tetragonal structure by creating a metastable non-equilibrium state in the alloy. Nitrogen or carbon or boron is also an essential element for increasing saturation magnetization and creating high coercive force required as a magnetic characteristic. The atomic ratio of the interstitial element selected from nitrogen, carbon and boron should be in the range of from 0.3 to 50%, preferably from 2 to 20%, more preferably from 5 to 15%.

If the atomic ratio of an interstitial element selected from nitrogen and/or carbon and/or boron is less than 0.3%, the saturation magnetization is insufficient, and lower limit of the atomic ratio of an interstitial element should be 0.3%. On the other hand, if the ratio is more than 50%, the saturation magnetization is undesirably reduced and the upper limit of the interstitial elements (i.e., nitrogen and/or carbon and/or boron) should be 50%. In order to stably form the tetragonal $ThMn_{12}$ body-centered structure, the atomic ratios of the interstitial elements nitrogen and/or carbon and/or boron present should be in the range from 2 to 20%, preferably from 5 to 15%.

In the present invention it is necessary that nitrogen and/or carbon and/or boron be present as the interstitial atom be present within the alloy at least for a short period of time, in order to create a local turbulence within the alloy so that a metastable non-equilibrium state is formed, which acts as an active state in the formation of the tetragonal $ThMn_{12}$ body-centered structure.

Therefore, as for nitrogen in particular, although a material already containing nitrogen can be used as a material to produce the permanent magnetic alloy, it is preferred to use the method of adding nitrogen to a powder of an alloy of the material by treating it in a gas or in a liquid containing nitrogen. Preferred gases include nitrogen gas ($N_2$), a mixture gas of nitrogen and hydrogen ($N_2+H_2$), ammonium gas ($NH_3$) and a mixed gas thereof (including a mixture gas diluted with hydrogen gas or other inert gas). Also, the treatment should be done at a temperature in the range of from 200° to 1,000° C., and preferably from 400° to 700° C. The duration of heat treatment should be in the range of from 0.2 to 50 hours, which can be varied in accordance with the preferred characteristics desired for the material.

As for the method by which B or C is incorporated, it is possible to use as starting materials those originally containing B or C. In this case, however, use of materials formed as very stable compounds of B or C is not preferred, because very stable compounds such as carbide with R and borides with R are not dissociated in the form of single atoms of B or C in alloys, and hence, it is often difficult for them to be present as atoms of interstitial type. As the starting materials for B or C, it is recommended to use pure elements such as carbon black and metallic boron, or compounds with relatively lower stability, such as a carbide with Fe such as $Fe_3C$, and commonly available ferroboron. In the present invention, B can be introduced as a compound containing N and C.

B and C are particularly effective for the iron-rare earth type permanent magnet containing no element M, among the iron-rare earth type permanent magnets according to the present invention, since that B and C, unlike N, can be readily introduced into such a material.

The above N, B and C may each be used alone. Their use in combination can be more effective in many instances. In particular, a combination of N and B and a combination of C and B are effective.

N, C and B are all atoms that can be present in the form of the atoms of an interstitial type. If they are incorporated into the alloy through different systems for example, if C and B are incorporated from the starting materials, and N is introduced from a gas, it is possible for them to be respectively held between lattices in which they can be held with ease in the respective systems. Thus, it can be expected therefrom that a system of an interstitial type can be more surely formed by utilizing both systems with different characteristics.

In order to more surely form the body-centered cubic structure, the present invention may be used in combination with a treatment such as super quenching or mechanical alloying.

An alloy having the $ThMn_{12}$ body-centered tetragonal structure cannot be formed by $SmFe_{12}$ since an iron atom is too small compared to a samarium atom when the ratio of Th (ionic radius of $Th^{4+}$=1.02) and Mn (ionic radius of $Mn^{2+}$=0.80) and the ratio of Sm (ionic radius of $Sm^{3+}$=1.00) and Fe (ionic radius of $Fe^{3+}$=0.60) are compared. The ThMn12 structure can be formed if a part of iron in $SmFe_{12}$ is substituted by Ti (ionic radius of $Ti^{3+}$=0.69), etc., thus making $SmFe_{11}Ti$. In FIG. 1, Ti or other elements are expected to occupy the site 8i, since their atomic diameters are larger than that of iron, then it is possible to form the $ThMn_{12}$ structure by expanding the lattice to match the size of the diameter of samarium. If this is so, if the interstitial and/or boron and/or carbon atom is used along with the above-described Ti or other elements in order to expand the lattice effectively, a stable $ThMn_{12}$ structure can be formed.

By including cobalt in an iron-rare earth metal permanent magnet material according to the present invention, the coercive force can be increased and the thermal characteristics of the magnetic material can be improved. In order to achieve the above-described improvements, the atomic ratio of cobalt should in the range of from 1 to 50%, preferably from 5 to 30%. If the ratio is less than 1%, the coercive force increases very little. If the ratio is more than 50%, the saturation magnetic flux gradually decreases. Thus, when the atomic ratio of cobalt is in the range of from 5 to 30%, the thermal characteristics of the magnetic material improve.

By including nickel in an iron-rare earth metal permanent magnetic material according to present invention, the anti-corrosion characteristics of the material can be improved. In order to achieve this improvement, the atomic ratio of nickel should be in the range of from 0.5 to 30%, preferably 2 to 10%. If the ratio is less than 0.5%, the improvement in the anti-corrosion characteristics is very little. If the ratio is more than 30%, the saturation magnetic flux density becomes too low.

The present invention is now described in greater detail with reference to specific illustrative examples, but the present invention is not to be construed as being limited to these examples. Unless otherwise indicated, all parts, percents, and ratios are by weight.

EXAMPLE 1

An alloy of composition in weight percent, 67.1 Fe, 21.5 Nd, 5.48 Ti and 5.95 Cr, was melted in an argon atmosphere. The atomic ratios of Fe, Nd, Ti and Cr were 76.1%, 9.42%, 7.25% and 7.25%, respectively.

The formed ingot was annealed at 900° C. for seven days and crushed in an iron mortar and then crushed in a disk mill to a particle size of about 30 μm. In order to permeate nitrogen into this powder, powder was thermally treated at approximately 500° C. in a nitrogen gas ($N_2$). As a result, 1.31 wt % of nitrogen was included in the material. Thus, the ratios of the components of the material were 66.2 wt % Fe, 21.2 wt % Nd, 5.41 wt % Ti, 5.87 wt % Cr and 1.31 wt % N, that is, the atomic ratios of the components of the material, Fe, Nd, Ti, Cr and N were 71.8%, 8.89%, 6.84%, 6.84% and 5.67%, respectively.

After the obtained powder was finely crushed in a jet mill, it was oriented in a magnetic field of 20 kOe, and then solidified with wax. The magnetic characteristics of the powder was as follows: the saturation magnetization was 137 emu/g and the coercive force (iHc) was 5,300 Oe.

When the powder was diffracted by X-ray diffraction using CuK α-rays, most of the power was of the $ThMn_{12}$ body-centered tetragonal structure.

EXAMPLE 2

An alloy of composition in weight percent, 67.4 Fe, 21.7 Nd and 7.20 Ti, was melted in an argon atomosphere. 21.6 Nd and 11.0 Ti was melted in an argon atomosphere. The atomic ratios of Fe, Nd and Ti were 76.1%, 9.42% and 14.5%, respectively.

The formed ingot was annealed at 900° C. for seven days and crushed in an iron mortar and then crushed in a disk mill to a particle size of about 30 μm. In order to permeate nitrogen into this powder, the powder was thermally treated at approximately 500° C. in a nitrogen gas ($N_2$). As a result, 1.26 wt % of nitrogen was included into the material. Thus, the ratios of the components of the material were 66.6 wt% Fe, 21.3 wt% Nd, 10.9 wt% Ti and 1.26 wt % N, that is, the atomic ratios of the components of the material, Fe, Nd, Ti and N were 72.0%, 8.91%, 13.7%, and 5.42%, respectively.

After the obtained powder was finely crushed in a jet mill, it was oriented in a magnetic field of 20 kOe, and then solidified wax. The magnetic characteristics of the powder was as follows: the saturation magnetization was 143 emu/g and the coercive force (iHc) was 7,800 Oe.

When the powder was diffracted by X-ray diffraction using CuK α-rays, most of the powder was of the $ThMn_{12}$ body-centered tetragonal structure.

EXAMPLE 3

An alloy of composition in weight percent, 71.1 Fe, 21.7 Nd and 7.20 Ti, was melted in an argon atomosphere. The atomic ratios of Fe, Nd and Ti were 80.9%, 9.56% and 9.56%, respectively.

The formed ingot was annealed at 900° C. for seven days and crushed in an iron mortar and then crushed in a disk mill to a particle size of about 30 μm. In order to permeate nitrogen into this powder, the powder was thermally treated at approximately 500° C. in a nitrogen gas ($N_2$). As a result, 1.15 wt% of nitrogen was included in the material. Thus, the ratios of the components of the material were 70.3 wt% Fe, 21.5 wt% Nd, 7.12 wt% Ti and 1.15 wt% N, that is, the atomic ratios of the components of the material, Fe, Nd, Ti and N were 76.8%, 9.08%, 9.08% and 5.03%, respectively.

After the obtained powder was finely crushed in a jet mill, it was oriented in a magnetic field of 20 kOe, and then solidified with wax. The magnetic characteristics of the powder was as follows: the saturation magnetization was 98 emu/g and the coercive force (iHc) was 3,100 Oe.

When the powder was diffracted by X-ray diffraction using CuK α-rays, most of the powder was of the $ThMn_{12}$ body-centered tetragonal structure.

EXAMPLE 4

An alloy of composition in weight percent, 73.9 Fe, 23.5 Sm and 2.60 B, was melted in an argon atomosphere. The atomic ratios of Fe, Sm and B were 76.9%, 9.09% and 14.0%, respectively.

The formed ingot was annealed at 900° C. for seven days and crushed in an iron mortar and then crushed in a disk mill to a particle size of about 30 μm. In order to permeate nitrogen into this powder, the powder was thermally treated at approximately 500° C. in a mixture of nitrogen gas ($N_2$) and hydrogen gas ($H_2$). As a result, 1.58 wt % of nitrogen was included in the material. Thus, the ratios of the components of the material were 72.7 wt % Fe, 23.1 wt % Sm, 2.56 wt % B and 1.58 wt % N, that is, the atomic ratios of the components of the material, Fe, Sm, B and N were 72.1%, 8.53%, 13.1%, and 6.23%, respectively.

After the obtained powder was finely crushed in a jet mill, it was oriented in a magnetic field of 20 kOe, and then solidified with wax. The magnetic characteristics of the powder was as follows: the saturation magnetization was 115 emu/g and the coercive force (iHc) was 3,100 Oe.

When the powder was diffracted by X-ray diffraction using CuK α-rays, most of the powder was the $ThMn_{12}$ body-centered tetragonal structure.

EXAMPLE 5

An alloy of composition in weight percent, 73.9 Fe, 22.5 Nd, 1.01 C and 2.60 B, was melted in an argon atomosphere. The atomic ratios of Fe, Nd, C and B are 73.3%, 8.67%, 4.67% and 13.3%, respectively.

The formed ingot is annealed at 900° C. for seven days and crushed in an iron mortar and then crushed in a disk mill to a particle size of about 30 μm.

After the obtained powder was finely crushed in a jet mill, it was oriented in a magnetic field of 20 kOe, and then solidified with wax. The magnetic characteristics of the powder was as follows: the saturation magnetization is 110 emu/g and the coercive force (iHc) is 2,500 Oe.

When the powder is diffracted by X-ray diffraction using CuK α-ray, most of the powder was of the $ThMn_{12}$ body-centered tetragonal structure.

EXAMPLE 6

An alloy of composition in weight percent, 55.6 Fe, 20.8 Nd, 10.6 Ti and 13.0 Co, was melted in an argon atomosphere. The atomic ratios of Fe, Nd, Ti and Co were 62.9%, 9.09%, 14.0% and 14.0%, respectively.

The formed ingot was annealed at 900° C. for seven days and crushed in an iron mortar and then crushed in a disk mill to a particle size of about 30 μm. In order to permeate nitrogen into this powder, the powder was thermally treated at approximately 450° C. in an ammonium gas ($NH_3$). As a result, 1.63 wt % of nitrogen was included in the material. Thus, the ratios of the components of the material were 54.7 wt % Fe, 20.4 wt % Nd, 10.4 wt % Ti, 12.8 wt % Co and 1.63 wt % N, that is, the atomic ratios of the components of the material, Fe, Nd, Ti, Co and N were 58.6%, 8.46%, 13.0%, 13.0% and 6.96%, respectively.

After the obtained powder was finely crushed in a jet mill, it was oriented in a magnetic field of 20 kOe, and then solidified with wax. The magnetic characteristics of the powder was as follows: the saturation magnetization was 117 emu/g and the coercive force (iHc) was 4,300 Oe.

When the powder was diffracted by X-ray diffraction using CuK α-rays, most of the powder was of the $ThMn_{12}$ body-centered tetragonal structure.

EXAMPLE 7

An alloy of composition in weight percent, 61.5 Fe, 21.5 Sm, 10.5 Ti and 6.46 Ni, was melted in an argon atomosphere. The atomic ratios of Fe, Sm, Ti and Ni were 69.9%, 9.09%, 14.0% and 6.99%, respectively.

The formed ingot was annealed at 900° C. for seven days and crushed in an iron mortar and then crushed in a disk mill to a particle size of about 30 μm. In order to permeate nitrogen into this powder, the powder was thermally treated at approximately 450° C. in a nitrogen gas ($N_2$). As a result, 0.292 wt % of nitrogen was included in the material. Thus, the ratios of the components of the material were 61.3 wt % Fe, 21.5 wt % Sm, 10.5 wt % Ti, 6.44 wt % Ni and 0.292 wt % N, that is, the atomic ratios of the components of the material, Fe, Sm, Ti, Ni and N are 69.0%, 8.97%, 13.8%, 6.90% and 1.31%, respectively.

After the obtained powder was finely crushed in a jet mill, it was oriented in a magnetic field of 20 kOe, and then solidified with wax. The magnetic characteristics of the powder was as follows: the saturation magnetization was 105 emu/g and the coercive force (iHc) was 2,900 Oe.

When the powder was diffracted by X-ray diffraction using CuK α-rays, most of the powder was of the $ThMn_{12}$ body-centered tetragonal structure.

EXAMPLE 8

An alloy of composition in weight percent, 65.6 Fe, 21.9 Sm, 10.7 Ti and 1.81 B, was melted in an argon atomosphere. The atomic ratios of Fe, Sm, Ti and B were 68.6%, 8.50%, 13.1% and 9.80%, respectively.

After the obtained powder was finely crushed in a jet mill, it was oriented in a magnetic field of 20 kOe and then solidified with wax. The magnetic characteristics of the powder was as follows: the saturation magnetization was 114 emu/g and the coercive force (iHc) was 5,900 Oe.

When the powder was diffracted by X-ray diffraction using CuK α-rays, most of the powder was of the $ThMn_{12}$ body-centered tetragonal structure.

EXAMPLE 9

An alloy of composition in weight percent, 66.5 Fe, 21.3 Nd, 10.9 Ti and 1.36 C, was melted in an argon atomosphere. The atomic ratios of Fe, Nd, Ti and C were 70.9%, 8.78%, 13.5% and 6.76%, respectively.

The formed ingot was annealed at 900° C. for seven days and crushed in an iron mortar and then crushed in a disk mill to a particle size of about 30 μm.

After the obtained powder was finely crushed in a jet mill, it was oriented in a magnetic field of 20 kOe, and then solidified with wax. The magnetic characteristics of the powder was as follows: the saturation magnetization was 111 emu/g and the coercive force (iHc) was 4,200 Oe.

When the powder was diffracted by X-ray diffraction using CuK α-rays, most of the powder was of the $ThMn_{12}$ body-centered tetragonal structure.

EXAMPLE 10

An alloy of composition in weight percent, 74.0 Fe, 19.9 Sm and 6.06 Ti, was melted in an argon atomosphere. The atomic ratios of Fe, Sm and Ti were 83.7%, 8.37% and 7.98%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 550° C. in a nitrogen gas ($N_2$). As a result, 2.20 wt % of nitrogen was included in the material. Thus, the ratios of the components of the material were 72.4 wt % Fe, 19.5 wt % Sm, 5.92 wt % Ti and 2.20 wt % N, respectively, that is, the atomic ratios of the components of the material, Fe, Sm, Ti and N were 76.0%, 7.60%, 7.25% and 9.19%, respectively.

After the obtained powder was finely crushed in a jet mill, it was oriented in a magnetic field of 20 kOe and then solidified with wax. The magnetic characteristics of the powder was as follows: the saturation magnetization was 122 emu/g and the coercive force (iHc) was 5,000 Oe.

When the powder was diffracted by X-ray diffraction method using CuK α-ray, most of the powder was of the $ThMn_{12}$ body-centered tetragonal structure.

EXAMPLE 11

An alloy of composition in weight percent, 67.7 Fe, 20.1 Sm, 6.09 Ti and 6.17 V, was melted in an argon atomosphere. The atomic ratios of Fe, Sm, Ti and V were 76.1%, 8.37%, 7.98% and 7.60%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 550° C. in a nitrogen gas ($N_2$). As a result, 2.37 wt % of nitrogen was included in the material. Thus, the ratios of the components of the material were 66.1 wt % Fe, 19.6 wt % Sm, 5.95 wt % Ti, 6.03 wt % V and 2.37 wt % N, respectively, that is, the atomic ratios of the components of the material, Fe, Sm, Ti, V and N were 68.6%, 7.55%, 7.20%, 6.86% and 9.81%, respectively.

After the obtained powder was finely crushed in a jet mill, it was oriented in a magnetic field of 20 kOe and then solidified with wax. The magnetic characteristics of the powder was as follows: the saturation magnetization was 106 emu/g and the coercive force (iHc) was 6,200 Oe.

When the powder was diffracted by X-ray diffraction method using CuK α-ray, most of the powder was of the $ThMn_{12}$ body-centered tetragonal structure.

EXAMPLE 12

An alloy of composition in weight percent, 73.9 Fe, 19.9 Sm and 6.25 Cr, was melted in an argon atomosphere.

The atomic ratios of Fe, Sm and Cr were 84.0%, 8.40% and 7.63%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 550° C. in a nitrogen gas ($N_2$). As a result, 1.97 wt % of nitrogen was included in the material. Thus, the ratios of the components of the material were 72.4 wt % Fe, 19.5 wt % Sm, 6.13 wt % Cr and 1.97 wt % N, respectively, that is, the atomic ratios of the components of the material, Fe, Sm, Cr and N were 77.0%, 7.70%, 7.00% and 8.33%, respectively.

After the obtained powder was finely crushed in a jet mill, it was oriented in a magnetic field of 20 kOe and then solidified with wax. The magnetic characteristics of the powder was as follows: the saturation magnetization was 97 emu/g and the coercive force (iHc) was 3,000 Oe.

When the powder was diffracted by X-ray diffraction method using CuK α-ray, most of the powder was of the $ThMn_{12}$ body-centered tetragonal structure.

EXAMPLE 13

An alloy of composition in weight percent, 80.2 Fe and 19.8 Sm, was melted in an argon atomosphere. The atomic ratios of Fe and Sm were 91.6% and 8.40%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 450° C. in an ammonium gas ($NH_3$). As a result, 2.52 wt % of nitrogen was included in the material. Thus, the ratios of the components of the material were 78.2 wt % Fe, 19.3 wt % Sm and 2.52 wt % N, respectively, that is, the atomic ratios of the components of the material, Fe, Sm and N were 82.0%, 7.51% and 10.5%, respectively.

After the obtained powder was finely crushed in a jet mill, it was oriented in a magnetic field of 20 kOe and then solidified with wax. The magnetic characteristics of the powder was as follows: the saturation magnetization was 121 emu/g and the coercive force (iHc) was 5,700 Oe.

When the powder was diffracted by X-ray diffraction method using CuK α-ray, most of the powder was of the $ThMn_{12}$ body-centered tetragonal structure.

EXAMPLE 14

An alloy of composition in weight percent, 73.4 Fe, 19.8 Sm, 6.01 Ti, 0.43 C and 0.39 B, was melted in an argon atomosphere. The atomic ratios of Fe, Sm, Ti, C and B were 80.0%, 8.00%, 7.64%, 2.18% and 2.18%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 550° C. in nitrogen gas ($N_2$). As a result, 1.68 wt % of nitrogen was included in the material. Thus, the ratios of the components of the material were 72.2 wt % Fe, 19.4 wt % Sm, 5.91 wt % Ti, 0.423 wt % C, 0.381 wt % B and 1.68 wt % N, respectively, that is, the atomic ratios of the components of the material, Fe, Sm, Ti, C, B and N were 74.5%, 7.45%, 7.11%, 2.03%, 2.03% and 6.91%, respectively.

After the obtained powder was finely crushed in a jet mill, it was oriented in a magnetic field of 20 kOe and then solidified with wax. The magnetic characteristics of the powder was as follows: the saturation magnetization was 126 emu/g and the coercive force (iHc) was 5,600 Oe.

When the powder was diffracted by X-ray diffraction method using CuK α-ray, most of the powder was of the $ThMn_{12}$ body-centered tetragonal structure.

EXAMPLE 15

An alloy of composition in weight percent, 66.4 Fe, 19.7 Sm, 5.97 Ti, 6.05 V, 0.428 C and 1.54 B, was melted in an argon atomosphere. The atomic ratios of Fe, Sm, Ti, V, C and B were 68.3%, 7.51%, 7.17%, 6.83%, 2.05% and 8.19%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 500° C. in an argon gas ($Ar_2$).

After the obtained powder was finely crushed in a jet mill, it was oriented in a magnetic field of 20 kOe and then solidified with wax. The magnetic characteristics of the powder was as follows: the saturation magnetization was 99 emu/g and the coercive force (iHc) was 6,700 Oe.

When the powder was diffracted by X-ray diffraction method using CuK α-ray, most of the powder was of the $ThMn_{12}$ body-centered tetragonal structure.

EXAMPLE 16

An alloy of composition in weight percent, 79.1 Fe, 19.5 Sm, 0.71 C and 0.64 B, was melted in an argon atomosphere. The atomic ratios of Fe, Sm, C and B were 85.1%, 7.80%, 3.55% and 3.55%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 550° C. in a nitrogen gas ($N_2$). As a result, 1.03 wt % of nitrogen was included in the material. Thus, the ratios of the components of the material were 78.3 wt % Fe, 19.3 wt % Sm, 0.702 wt % C, 0.632 wt % B and 1.03 wt % N, respectively, that is, the atomic ratios of the components of the material, Fe, Sm, C, B and N were 81.5%, 7.47%, 3.39%, 3.39% and 4.28%, respectively.

After the obtained powder was finely crushed in a jet mill, it was oriented in a magnetic field of 20 kOe and then solidified with wax. The magnetic characteristics of the powder was as follows: the saturation magnetization was 126 emu/g and the coercive force (iHc) was 4,900 Oe.

When the powder was diffracted by X-ray diffraction method using CuK α-ray, most of the powder was of the $ThMn_{12}$ body-centered tetragonal structure.

EXAMPLE 17

An alloy of composition in weight percent, 78.7 Fe, 19.4 Sm, 0.99 C and 0.89 B, was melted in an argon atomosphere. The atomic ratios of Fe, Sm, C and B were 82.8%, 7.59%, 4.83% and 4.83%, respectively.

The formed ingot was annealed at 900° C. for seven days and crushed in an iron mortar and then crushed in a ball mill in the organic solvent particle size of about 10 μm. In order to permeate nitrogen in this powder, the powder was thermally treated at approximately 500° C. in an argon gas ($Ar_2$).

After the obtained powder was finely crushed in a jet mill, it was oriented in a magnetic field of 20 kOe and then solidified with wax. The magnetic characteristics of the powder was as follows: the saturation magnetization was 120 emu/g and the coercive force (iHc) was 5,000 Oe.

When the powder was diffracted by X-ray diffraction method using CuK α-ray, most of the powder was of the $ThMn_{12}$ body-centered tetragonal structure.

EXAMPLE 18

Other permanent magnet materials were formed in the same methods as described in Example 1. Each material has the composition as shown in Table 1, and the properties of each material are also shown in Table 1. It was found that the present invention is very suitable for a permanent magnet material.

EXAMPLE 19

Other permanent magnet materials were formed in the same methods as described in Example 7. Each material has the composition as shown in Table 2, and the properties of each material are also shown in Table 2. It was found that the present invention is very suitable for a permanent magnet material.

TABLE 1

| No. | Composition (upper row at %, lower row wt %) | | | | | Saturation magnetization (emu/g) | Coercive force (Oe) |
|---|---|---|---|---|---|---|---|
| 1 | Fe | Nd | Ti | V | N | 139 | 4,600 |
| | 71.7 | 8.87 | 6.83 | 6.83 | 5.80 | | |
| | 66.3 | 21.2 | 5.41 | 5.76 | 1.35 | | |
| 2 | Fe | Nd | Ti | Nb | N | 127 | 4,200 |
| | 72.2 | 8.94 | 6.87 | 6.87 | 5.16 | | |
| | 63.4 | 20.3 | 5.18 | 10.0 | 1.14 | | |
| 3 | Fe | Nd | V | N | | 121 | 3,300 |
| | 72.3 | 8.95 | 13.8 | 4.96 | | | |
| | 66.2 | 21.2 | 11.5 | 1.14 | | | |
| 4 | Fe | Nd | Mo | N | | 105 | 2,600 |
| | 78.0 | 9.65 | 7.42 | 4.97 | | | |
| | 66.7 | 21.3 | 10.9 | 1.07 | | | |
| 5 | Fe | Nd | W | N | | 95 | 3,400 |
| | 78.3 | 9.69 | 7.46 | 4.55 | | | |
| | 60.7 | 19.4 | 19.0 | 0.884 | | | |
| 6 | Fe | Nd | Si | N | | 88 | 2,600 |
| | 73.3 | 9.07 | 14.0 | 3.70 | | | |
| | 70.0 | 22.4 | 6.71 | 0.886 | | | |
| 7 | Fe | Nd | Al | N | | 85 | 3,800 |
| | 71.8 | 8.89 | 13.7 | 5.61 | | | |
| | 69.9 | 22.3 | 6.43 | 1.37 | | | |
| 8 | Fe | Nd | Mn | N | | 95 | 3,400 |
| | 81.9 | 10.1 | 3.90 | 4.06 | | | |
| | 72.5 | 23.2 | 3.40 | 0.901 | | | |
| 9 | Fe | Nd | Zr | N | | 127 | 2,600 |
| | 75.1 | 9.30 | 10.7 | 4.86 | | | |
| | 63.7 | 20.4 | 14.9 | 1.04 | | | |
| 10 | Fe | Nd | Ta | N | | 98 | 2,600 |
| | 78.5 | 9.72 | 7.47 | 4.34 | | | |
| | 60.9 | 19.5 | 18.8 | 0.844 | | | |
| 11 | Fe | Nd | Sn | N | | 81 | 2,100 |
| | 82.0 | 10.1 | 3.90 | 3.98 | | | |
| | 69.8 | 22.3 | 7.06 | 0.85 | | | |
| 12 | Fe | Nd | Hf | N | | 120 | 3,900 |
| | 77.9 | 9.64 | 7.42 | 5.05 | | | |
| | 61.0 | 19.5 | 18.6 | 0.99 | | | |

TABLE 2

| No. | Composition (upper row at %, lower row wt %) | | | | Saturation magnetization (emu/g) | Coercive force (Oe) |
|---|---|---|---|---|---|---|
| 1 | Fe | Nd | Ta | N | 98 | 2,600 |
| | 78.5 | 9.72 | 7.47 | 4.34 | | |
| | 60.9 | 19.5 | 18.8 | 0.844 | | |
| 2 | Fe | Nd | Sn | N | 78 | 4,800 |
| | 82.0 | 10.1 | 3.90 | 3.98 | | |
| | 69.8 | 22.3 | 7.06 | 0.85 | | |
| 3 | Fe | Nd | Hf | N | 120 | 3,900 |
| | 77.9 | 9.64 | 7.42 | 5.05 | | |
| | 61.0 | 19.5 | 18.6 | 0.99 | | |

While the invention has been described in detail and with reference to specific embodiments thereof, it will be apparent to one skilled in the art that various changes and modifications can be made therein without departing from the spirit and scope thereof.

What is claimed is:

1. A permanent magnet consisting of an iron-rare earth permanent magnetic composition and binder, wherein said iron-rare earth permanent magnetic composition comprises a predominant phase including nitrogen as an interstitial atom, and consisting essentially of an iron-based alloy and having a composition represented by the following formula:

$$Fe_aR_bM_cN_dCo_gNi_h$$

wherein R represents at least one element selected from the group consisting of Y, Th and lanthanide elements;

M represents at least one element selected from the group consisting of Ti, Cr, V, Zr, Nb, Al, Mo, Mn, Hf, Ta, W, Mg, Si, Sn, Ge and Ga;

said elements are present in atomic percentages indicated by a, b, c, d, g and h, wherein $a+b+c+d+g+h=100$ atomic %; and further, $3 \leqq b \leqq 30$ $0.5 \leqq c \leqq 30$ $0.3 \leqq d \leqq 50$ $0 \leqq g \leqq 50$, and $0 \leqq h \leqq 30$;

and where said nitrogen is introduced by heating the composition in a nitrogen containing gas atmosphere at 200° C. to 700° C.

2. A permanent magnet consisting of an iron-rare earth permanent magnetic composition and binder, wherein said iron-rare earth permanent magnetic composition comprises a predominant phase including nitrogen as an interstitial atom, and consisting essentially of an iron-based alloy and having a composition represented by the following formula:

$$Fe_aR_bM_cN_dB_eC_fCo_gNi_h$$

wherein R represents at least one element selected from the group consisting of Y, Th and lanthanide elements;

M represents at least one element selected from the group consisting of Ti, Cr, V, Zr, Nb, Al, Mo, Mn, Hf, Ta, W, Mg, Si, Sn, Ge and Ga;

said elements are present in atomic percentages indicated by a, b, c, d, e, f, g and h, wherein $a+b+c+d+e+f+g+h=100$ atomic %; and, further, $3 \leqq b \leqq 30$;

$0.5 \leqq c \leqq 30$;

$0.3 \leqq d \leqq 50$;

$0 \leqq e \leqq 50$;

$0 \leqq f \leqq 50$, provided that $0.3 \leqq d+e+f \leqq 50$;

$0 \leqq g \leqq 50$; and $0 \leqq h \leqq 30$;

and where said nitrogen is introduced by heating the composition in a nitrogen containing gas atmosphere at 200° C. to 700° C.

* * * * *